United States Patent
Le Helloco et al.

(10) Patent No.: US 6,689,908 B1
(45) Date of Patent: Feb. 10, 2004

(54) POLYALKOXYLATED SUPERAMIDES OPTIONALLY FUNCTIONALIZED, USE AS EMULSIFIERS

(75) Inventors: Jean-Guy Le Helloco, Levallois Perret (FR); Jean-Lue Joye, Cranbury, NJ (US); Cristiano Carlo Taverna, Vanzago (IT)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 10/070,367

(22) PCT Filed: Sep. 11, 2000

(86) PCT No.: PCT/FR00/02502

§ 371 (c)(1),
(2), (4) Date: Jul. 23, 2002

(87) PCT Pub. No.: WO01/18092

PCT Pub. Date: Mar. 15, 2001

(30) Foreign Application Priority Data

Sep. 9, 1999 (FR) .............................................. 99 11295

(51) Int. Cl.[7] ........................ C07C 233/05; C09K 7/06; C08G 65/26; B01F 17/22
(52) U.S. Cl. ...................... 564/153; 564/133; 516/131; 510/264; 508/194; 252/392
(58) Field of Search ................................ 564/153, 133; 516/131; 252/392; 510/264; 508/194

(56) References Cited

FOREIGN PATENT DOCUMENTS

| DE | 19 16 283 | 10/1970 |
|----|-----------|---------|
| DE | 26 05 502 | 8/1977 |
| DE | 196 50 537 | 6/1998 |
| JP | 8-337560 | * 12/1996 |
| WO | WO 98/13450 | 4/1998 |

OTHER PUBLICATIONS

Database WPI, Section CH, Week 199710, Derwent Publications Ltd., London, GB; XP002139619 & JP 08 337560, 1997.
Database WPI, Section CH, Week 199739, Derwent Publications Ltd., London, GB; XP002139621 & JP 09 188894, 1997.
Database WPI, Section CH, Week 199313, Derwent Publications Ltd., London, GB; XP002139622 & JP 05 043889, 1997.

* cited by examiner

*Primary Examiner*—Shailendra Kumar
(74) *Attorney, Agent, or Firm*—Burns, Doane, Swecker & Mathis, L.L.P.

(57) ABSTRACT

The invention concerns polyalkoxylated superamides of the following formulae: $[R_1-CONR^2-CH_2CHR^3-O-CHR^4-CHR^5O)_m-(CH_2CH_2O)_n]_9$ $_p(I)$; $R^1-CON-[CH_2CHR^3-O-(CHR^4-CHR^5O)_m-(CH_2CH_2O)_n-X]_2$, formulae wherein: $R^1$ presents a $C_7-C_{22}$ hydrocarbon radical; $R^2$, $R^3$, represent a hydrogen or a $C_1-C_4$ hydrocarbon radical; $R^4$, $R^5$ represent a hydrogen or an alkyl radical comprising 1 to 2 carbon atoms, provided that one or more of said two radicals is a hydrogen; X represents a hydrogen, a $C_1-C_6$ hydrocarbon radical, a phosphate, carboxylate, sulphate, sulphonate group; m ranges between 0 and 20 exclusive; n ranges between 0 and 50 exclusive; p is equal to 1 or 2, depending on what X represents. The invention also conerns a method for obtaining said compounds and their use in particular as emulsifying agent for oils.

20 Claims, No Drawings

POLYALKOXYLATED SUPERAMIDES OPTIONALLY FUNCTIONALIZED, USE AS EMULSIFIERS

This application is a G 371 of PCT/FR00/02502, field Sep. 11, 2000.

The present invention relates to polyalkoxylated superamides, which may be functionalised. More particularly, it relates to superamides comprising a block derived from propylene oxide then a block derived from ethylene oxide.

The present invention also relates to their use as an emulsifying agent, preferably for oils.

It also relates to the use of such compounds as a lubricating agent or as an anti-corrosion agent.

The term "superamides" means the family of alkanolamides obtained by transamidification of a fatty acid ester.

Alkanolarnides exist that are obtained by amidification of a fatty acid. However, they are obtained in the form of a mixture comprising the amide, amine, fatty acid and water. Typically, the amide concentration is 60–65%.

In contrast, in the case of superamides, the final mixture contains more than 90% of superamides, constituting a clear advantage. During synthesis of the superamide, the alcohol from the fatty acid used is distilled off during the reaction, taking that reaction to completion.

The superamides of the invention correspond to the following formulae (I) and/or (II):

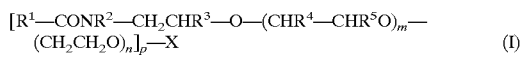

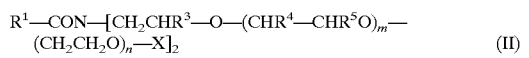

in which formulae:
  $R^1$ represents a linear or branched, saturated or unsaturated $C_7$–$C_{22}$ hydrocarbon radical, which optionally carries at least one hydroxyl group;
  $R^2$ represents a hydrogen atom or a $C_1$–$C_4$ hydrocarbon radical;
  $R^3$ represents a hydrogen atom or a $C_1$–$C_4$ hydrocarbon radical;
  $R^4$ and $R^5$, which may or may not be identical, represent a hydrogen atom or an alkyl radical containing 1 or 2 carbon atoms, provided that at most one of these two radicals is a hydrogen atom;
  X represents a hydrogen atom, a $C_1$–$C_6$ hydrocarbon radical, or a phosphate, carboxylate, sulphate or sulphonate group;
  m is an average number in the range 0 (excluded) to 20;
  n is an average number in the range 0 (excluded) to 50;
  p is 1 or 2, depending on the nature of X.

More particularly, radical $R^1$ is a linear or branched, saturated or unsaturated $C_{10}$–$C_{22}$ hydrocarbon radical, optionally carrying at least one hydroxyl group. Preferably, said radical comprises at least one ethylenically unsaturated bond.

More precisely, radical $R^1$ derives from fatty acids or oils of animal or plant origin.

Examples of $C_{10}$–$C_{22}$ saturated fatty acids that can be cited include lauric acid, capric acid, decanoic acid, stearic acid, isostearic acid, gadoleic acid, myristic acid and mixtures thereof Non limiting examples of $C_{10}$–$C_{22}$ fatty acids carrying at least one ethylenically unsaturated bond that can be cited are linderic acid, myristoleic acid, palmitoleic acid, oleic acid, petroselenic acid, doeglic acid, erucic acid, linoleic acid, linolenic acid, isanic acid, stearodonic acid, arachidonic acid, chypanodonic acid, ricinoleic acid and mixtures thereof.

Of the above acids, radical $R^1$ more particularly derives from fatty acids selected from palmitoleic acid, oleic acid, petroselenic acid, erucic acid, linoleic acid, linolenic acid, ricinoleic acid and mixtures thereof.

Oils from which radical $R^1$ derives that can be cited include oils of animal or plant origin.

Suitable animal oils that can be cited include sperm whale oil, dolphin oil, whale oil, seal oil, sardine oil, herring oil, dogfish oil, cod liver oil; calves' foot oil and beef, pork, horse or sheep fat (tallow).

Examples of oils of plant origin that can be mentioned include rapeseed oil, sunflower seed oil, peanut oil, olive oil, walnut oil, corn oil, soya oil, linseed oil, hemp oil, grapeseed oil, coprah oil, palm oil, cottonseed oil, babassu oil, jojoba oil, sesame seed oil, castor oil and coriander oil. Preferably, rapeseed oil is used.

Finally, $R^1$ can derive from products resulting from alcoholysis reactions, more precisely methanolysis of the above oils.

Radicals $R^2$ and $R^3$, which may or may not be identical, represent a hydrogen atom or a $C_1$–$C_4$ hydrocarbon radical, which is more particularly saturated. Preferably, radicals $R^2$ and $R^3$ represent a hydrogen atom, or a methyl radical, an ethyl radical, a propyl radical or its isomers, or a butyl radical or its isomers.

More preferably, radicals $R^4$ and $R^5$ are selected from hydrogen or the methyl radical, provided that at least one of the two radicals but not both at the same time represents a hydrogen atom. In this preferred embodiment, this motif derives from propylene oxide.

The coefficient m, representing an average number, is in the range 0 (excluded) to 20. Preferably, this coefficient is in the range 0 (excluded) to 10.

The coefficient n, representing an average number, is in the range 1 to 50, more particularly in the range 1 to 20.

The compounds of the present invention can be in the non ionic or ionic form.

In the first possibility, radical X represents a hydrogen atom or a $C_1$–$C_6$ hydrocarbon radical. In such a case, the value of coefficient p is 1.

In the second possibility, the superamides are in an ionic form.

A first variation of this possibility corresponds to compounds in which X represents a phosphate function. In this first variation, we can envisage superamides in which the coefficient p is 1 (phosphate monoester) or p is 2 (phosphate diester). More precisely, in the case of formula (I), the phosphated superamide corresponds to the following formula:

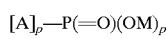

In this formula:
  A represents $R^1$—$CONR^2$—$CH_2CHR^3O$—$(CHR^4$—$CHR^5O)_m$—$(CH_2CH_2O)_n$—
  $R^1$, $R^2$, $R^3$, $R^4$, $R^5$, m and n being as defined above;
  M represents a hydrogen atom, an alkali or alkaline-earth metal, an ammonium residue with formula $N(R)_4^+$ where R, which may or may not be identical, corresponds to a hydrogen atom, a saturated or unsaturated, linear, branched or cyclic $C_1$–$C_{22}$ hydrocarbon radical, preferably $C_1$–$C_6$, optionally carrying at least one hydroxyl group;

p corresponds to 1 or 2, p' to 2 or 1, and p+p'=3.

A second variation of this possibility corresponds to compounds for which X represents a carboxylate function with formula —$(CH_2)_r$—COOM, in which:

M has the definition given above;

r equals 1 or 2.

In a third variation, the compound of the invention comprises a radical X defined by the following formula: —$SO_3M$, in which M is as defined above.

In a fourth variation, the compounds of the invention comprise a radical X defined by the following formula: —$(CH_2)_s$—$SO_3M$, in which formula M has the meanings given above, and s is equal to 2 or 3.

It should be noted that the superamides of the invention could be present alone or as a mixture.

The process for preparing the superamides described above consists of carrying out the following steps:

a) firstly, reacting a fatty acid ester the acid-derived portion of which is a linear or branched, saturated or unsaturated $C_7$–$C_{22}$ hydrocarbon radical that may carry at least one hydroxyl group; and in which the alcohol-derived portion is a $C_1$–$C_4$ hydrocarbon radical, with an alkanolamine with formula $NH_1R_2$—$CH_2$—$CHR^3$—OH or NH—$(CH_2$—$CHR^3$—$OH)_2$, optionally in the presence of a basic compound;

b) reacting the product obtained at the end of step a) with a compound with formula:

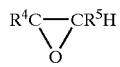

where $R^4$ and $R^5$ are as defined above c) reacting the product obtained at the end of step b) with ethylene oxide;

d) optionally, carrying out a step for functionalising the product obtained during step e) with the aim of replacing the terminal hydrogen atom with a hydrocarbon radical, a phosphate function, a carboxylate function, a sulphate function or a sulphonate function;

the proportions of the various reactants employed being such that formulae (I) or (II) are satisfied Step a) is carried out in the presence of a fatty acid ester or a mixture of such esters. The fatty acids described in the definition of radical $R^1$ can be carried out and the list will not be repeated here. Regarding the alcohol portion of the ester used as a reactant in step a), this derives from an alcohol, preferably a $C_1$–$C_4$ alcohol. More particularly, methyl esters, ethyl esters, propyl esters, isopropyl esters or butyl esters and their isomers can be used in the process of the invention.

It should be noted that this first step can advantageously be carried out from the products resulting from alcoholysis reactions (more particularly methanolysis) of oils of animal or plant origin, in particular selected from those mentioned above.

Examples of alkanolamines that are suitable for carrying out the process that can be cited are monoethanolamine, diethanolamine, isopropylamine, diisopropylamine and methylethanolamine, ethylethanolamine. Preferably, monoethanolamine is used.

More particularly, the mole ratio of the alkanolamine to the ester is in the range 0.8 to 1.2. A ratio that is close to stoichiometry is suitable (between 1 and 1.1).

Step a) can be carried out in the presence or absence of a basic catalyst. Preferably, such a compound is employed. More particularly, this latter is selected from alkali metal alcoholates such as sodium methylate, sodium ethylate, potassium methylate or potassium ethylate. It is also possible to use alkali metal hydroxides such as sodium or potassium hydroxide; or alkali metal carbonates such as sodium carbonate or potassium carbonate.

The quantity of this catalyst, if present, is normally in the range 0.01% to 5% by weight with respect to the superamide.

The reaction temperature is generally in the range 50° C. to 150° C. It is advantageously higher than the boiling point of the alcohol produced during the reaction to eliminate that alcohol as it appears in the mixture.

Once the reaction has been carried out, step b) is carried out. It should be noted that a step for purifying the product obtained is not obligatory.

Step b) thus consists of bringing the amide obtained into contact with an alkylene oxide with formula:

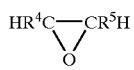

Preferably, the alkylene oxide is propylene oxide.

More particularly, the reaction is carried out under basic conditions, for example by employing a basic catalyst of the type used in step a). It is also possible to envisage said reaction being carried out in the presence of a Lewis acid such as titanium trichloride or boron trifluoride.

The number of moles of alkylene oxide introduced is such that it allows access to an alkoxylated superamide in which coefficient m corresponds to the values indicated above.

The temperature at which the reaction is carried out is normally between 80° C. and 1 80° C.

Preferably, it is carried out in an atmosphere that is inert under the reaction conditions (for example nitrogen).

It is also possible to envisage carrying out the reaction in the presence of a solvent. This latter is selected from compounds that are inert under the reaction conditions. Suitable compounds that can be cited are aromatic or non aromatic hydrocarbon solvents such as hexane, toluene or xylene. It is also possible to use halogenated solvents such as chloroform, or cyclic or non cyclic ether type solvents such as dibutylether or tetrahydrofuran.

The product obtained from step b) is advantageously brought into contact with ethylene oxide without intermediate purification (which is unnecessary).

The number of moles of ethylene oxide introduced is such that it can produce an alkoxylated/ethoxylated superamide the coefficient n of which corresponds to the values indicated in formulae (I) and (II).

The reaction conditions are similar to those detailed in step b), to which reference should be made in this regard.

Preferably, steps b) and c) are carried out under basic conditions. More particularly, the quantity of base required for the two steps is added at the beginning of the first step. Normally, the amount of base is between 0.5‰ and 0.7% by weight with respect to the initial superamide engaged in steps b) then c).

Once step c) is complete, the excess base remaining in the medium is preferably neutralised. To this end, the reaction medium is brought into contact with an acid that can be selected from organic acids such as carboxylic acids, more particularly acetic acid, for example; or sulphonic acids such as dodecylbenzene sulphonic acid.

It is also possible to use a mineral acid such as hydrochloric acid or sulphuric acid.

By way of illustration, the quantity of acid used is such that the pH of a mixture comprising 5 g of product supplemented with 45 g of ethanol and 50 g of water is in the range 8 to 11.

At the end of step c), the product obtained is a superamide comprising two oxyalkylenated blocks, the first being an oxyalkylenated block comprising at least one radical that is other than hydrogen (preferably oxypropylenated) then an oxyethylenated block. Radical X is hydrogen.

As indicated above, it is possible to functionalise such a compound by carrying out a step d).

In the case in which hydrogen is to be replaced by a hydrocarbon radical, contact is made with a compound with formula R—Hal, in which R represents a $C_1$–$C_6$ hydrocarbon radical, preferably saturated, and Hal represents a halogen atom, preferably chlorine or bromine.

When the hydrogen is to be replaced by a phosphate group, the product from step c) is brought into contact with a reactant of the nature of phosphoric acid, polyphosphoric acid, phosphoric anhydride or phosphorous oxychloride.

When hydrogen is to be replaced by a carboxylate group, the product obtained during step c) is brought into contact with monochloroacetic acid or an alkali metal salt (r=1) or with acrylic acid derivatives (r=2).

When hydrogen is to be replaced with a sulphate group, the product obtained during step c) is brought into contact with sulphur trioxide, sulphuric acid or oleum, chlorosulphonic acid or sulphamic acid.

When hydrogen is to be replaced by a sulphonate group, the product from step c) is reacted with derivatives of thionyl chloride (s=2) followed by contact with bisulphite or with propane sulphone (s=3).

It should be noted that these functionalisation reactions are known to the skilled person.

The polyoxyalkylenated superamide of the present invention has a number of applications. They have anti-corrosive, lubricating, and emulsifying properties.

The polyoxyalkylenated superamide can be employed as an emulsifying agent for fluids comprising phases that are mutually immiscible or only slightly miscible.

More particularly, the superamide of the invention has very advantageous emulsifying properties if one of the phases cited above is an oil or an oil derivative, or a fatty acid ester, these compounds possibly being present alone or as a mixture.

The oils can be selected from organic, animal or plant oils or from mineral oils.

Oils of animal origin that can be cited include sperm whale oil, dolphin oil, whale oil, seal oil, sardine oil, herring oil, dogfish oil, cod liver oils.

Examples of oils of plant origin that can be mentioned include rapeseed oil, sunflower seed oil, peanut oil, olive oil, walnut oil, corn oil, soya oil, linseed oil, hemp oil, grapeseed oil, coprah oil; palm oil, cottonseed oil, babassu oil, jojoba oil, sesame seed oil, castor oil, and coriander oil.

Particular mineral oils that can be emulsified by the compounds of the invention that can be cited include petroleum oils, naphthene oils, paraffin oils.

Oil derivatives that can be cited are alcoholysis products, more precisely methanolysis of oils.

Suitable fatty acid esters are esters in which the acid derived portion is derived from fatty acids with a linear or branched, saturated or unsaturated $C_7$–$C_{22}$ hydrocarbon radical, preferably $C_{10}$–$C_{22}$, optionally carrying at least one hydroxyl group, and wherein the alcohol portion derives from an alcohol comprising a linear or branched, saturated or unsaturated $C_1$–$C_{10}$ hydrocarbon radical. The fatty acids listed above are suitable and will not be repeated here. Methyl, ethyl, propyl, butyl esters can be employed in particular.

It has been noted that, completely unexpectedly, the polyoxypropylenated-polyoxyethylenated superamides have oil emulsification properties, while homologous compounds carrying polyoxyethylenated-polyoxypropylenated blocks do not possess such a property.

Further, the superamides of the invention have anti-corrosive properties.

Finally, the compounds of the invention contain no free fatty acid and/or free amines, which has an advantage for certain applications.

Non limiting examples of a number of fields of application of the superamides of the invention that can be cited are:

metal treatment: in particular in cutting fluids, rolling fluids, drawing fluids, deformation fluids, protection fluids, cooling fluids, in which emulsifying and/or anti-corrosive properties are sought;

textiles: in particular as a lubricant in textile fibre spinning operations, or as an emulsifying agent for mineral oils or silicone anti-foaming agents;

elastomers: processing aid;

plant protection: as an emulsifying agent for all plant protection formulations (including emulsifiable concentrates, emulsions, micro-emulsions);

construction/coating: for example as an asphalt emulsifying agent;

paper industry: paraffin oil emulsifying agent, or anti-foaming agent (in particular silicone);

water treatment: polymer emulsifying agent;

oil exploration, industrial detergents.

Metal treatment is a more particular instance of use of the superamides of the invention.

The fluids employed in this application are well known.

They are normally in the form of concentrated emulsions or micro-emulsions, which are then diluted by the user. They can also be in the form of emulsifiable concentrates that are emulsified by the user.

These fluids preferably comprise an oil, a derivative or a fatty acid ester acting as the phase that is slightly immiscible or immiscible with water. Organic or mineral oils or their derivatives and the fatty acid esters mentioned above can appropriately be used in this application. Preferably, oils are used. To simplify the text, we will use the term "oil" below to designate all of the compounds.

The oil content can vary widely. It can represent up to 90% by weight of the concentrate. Preferably, the water content is between 0 (excluded) and 50% by weight.

The water content is normally in the range 0 (excluded) to 50% by weight of the fluid.

Further, the content of polyoxyalkylenated superamides of the invention is more particularly in the range 0 (excluded) to 40% by weight of fluid.

In addition to water, the oil and the compound of the invention, the fluids can optionally comprise other emulsifying agents. Emulsifying agents that can be cited include non ionic and anionic surfactants. The amount of such compounds is normally in the range 0 to 30% by weight of fluid.

The fluids can also comprise conventional additives used in lubrication, such as fatty acids, for example those mentioned above, and also esters of these fatty acids. It is also possible to use extreme pressure additives, which are compounds based on chlorine, sulphur, phosphorus or combinations thereof Note that these fluids can also comprise conventional additives such as polyesters.

The fluids can also comprise one or more anti-corrosion agents, such as amines, alkanolamines, azoles, carboxylates, borates of amines and boroalkanolamides. Said fluids can also comprise biocides, bactericides, anti-foaming agents or coupling agents (such as alcohols and glycols).

The amount of such compounds is normally between 0 and 20% by weight.

It has also unexpectedly been noticed that while the polyoxyalkylenated superamides family acts as an oil emulsifying agent or anticorrosion agent, some functionalised polyoxyalkylenated superamides have additional properties.

When radical X is a phosphate, the alkanolamides of the invention have anti-wear properties.

Alkanolamides in which radical X is a carboxylate possess highly advantageous dispersing properties, in particular in the presence of fatty acids in the form of alkaline-earth metal salts (soaps) or as precipitates.

A non limiting example of the invention will now be given.

EXAMPLE

1. Preparation of Superamide

Rapeseed oil methyl esters were introduced into a reactor then monoethanolamine was added (ester/monoethanolamine mole ratio=1:1.025). Concentrated sodium hydroxide was then added (0.1% by weight with respect to the superamide obtained).

The temperature was about 140° C. and the reaction was carried out in nitrogen.

The reaction period was about 6 hours.

During the reaction, methanol was distilled off.

The reaction progress was monitored by measuring the amine index. The reaction was stopped with an index of less than 15 mg of KOH/Wg of product.

The excess unreacted alkanolamine was distilled off and the mixture was then cooled.

2. Preparation of Polyalkoxylated Superamide

The superamide obtained above was melted and introduced into a reactor. 0.2% of potassium hydroxide was then added (the percentage is expressed by weight with respect to the superamide; the potassium hydroxide concentration was 50%). The mixture was heated to 120° C. under vacuum for 1 hour.

The reactor was then purged and placed under nitrogen. The reaction mixture was stripped under vacuum.

The mixture was then heated to 150° C. and propylene oxide was added (3 moles) and the ensemble was kept at the same temperature for 1 hour.

Ethylene oxide (3 moles) was then added under the same conditions. Once addition was complete, the reaction mixture was kept at 150° C. for 1 hour.

The reaction mixture was then cooled to 70° C. and stripped under vacuum for one hour.

The excess base present in the product obtained was neutralised by adding acetic acid.

At the end of this procedure, a liquid was recovered.

3. Evaluation of Emulsification Properties of Superamide

The properties of the superamide obtained in point 2/ were determined and compared with those of a superamide carrying the same number of ethylene oxide (EO) and propylene oxide (PO) motifs as the superamide obtained in point 2/ but carrying PO and EO blocks the sequence of which was reversed (to obtain this product, the process described in point 2/ was repeated but the order of introducing the propylene oxide and the ethylene oxide was reversed compared with the described procedure).

Determination of Emulsifying Power 1 g of test surfactant and 9 g of test oil were mixed in a 25 ml beaker.

The contents of the beaker were then slowly poured into a 100 ml test tube containing 90 ml of deionised water.

The test tube was then tumbled 20 times by hand around a median axis perpendicular to the axis of the test tube, each turn lasting 3–5 seconds.

The emulsifying power was determined as follows:

immediate separation of the 2 phases: score 0;

settling in less than 10 seconds; score 1;

settling in less than 5 minutes: score 2;

no settling in 5 minutes: score 3.

The tests were carried out with two types of mineral oils:

Oil 1: paraffin mineral oil: Neutral Oil 100 sold by Mobil;

Oil 2: naphthenic mineral oil: Catenex N 912 sold by Shell.

At the end of the test, the mixture comprising the superamide of the invention was given a score of 3, for the two test oils, while the comparative mixture scored 0.

A stability test was carried out for the mixtures comprising the superamide of the invention, at 20° C. and 40° C. (measure of the settling depth after a given time). No destabilisation of the mixture was observed. The settling depth was zero after 24 hours at 20° C. and 40° C.

What is claimed is:

1. Polyalkoxylated superamides with the following formulae:

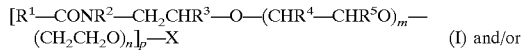

(I) and/or

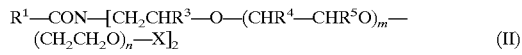

(II)

in which formulae:

$R^1$ represents a linear or branched, saturated or unsaturated $C_7$–$C_{22}$ hydrocarbon radical, which optionally carries at least one hydroxyl group;

$R^2$ represents a hydrogen atom or a $C_1$–$C_4$ hydrocarbon radical;

$R^3$ represents a hydrogen atom or a $C_1$–$C_4$ hydrocarbon radical;

$R^4$ and $R^5$, which may or may not be identical, represent a hydrogen atom or an alkyl radical containing 1 or 2 carbon atoms, provided that at most one of said two radicals is a hydrogen atom;

X represents a hydrogen atom, a $C_1$–$C_6$ hydrocarbon radical, or a phosphate, carboxylate, sulphate or sulphonate group;

m is an average number in the range 0 (excluded) to 20;

n is an average number in the range 0 (excluded) to 50;

p is 1 or 2, depending on the nature of X.

2. Polyalkoxylated superamides according to claim 1, wherein radical $R^1$ is a linear or branched, saturated or unsaturated $C_{10}$–$C_{22}$ hydrocarbon radical, optionally carrying at least one hydroxyl group.

3. Polyalkoxylated superamides according to claim 2, wherein radical $R^1$ is derived from saturated $C_{10}$–$C_{22}$ fatty acids and mixtures thereof.

4. Polyalkoxylated superamides according to claim 2, wherein radical $R^1$ is derived from $C_{10}$–$C_{22}$ fatty acids containing at least one ethylenically unsaturated bond and mixtures thereof.

5. Polyalkoxylated superamides according to claim 1, wherein radical $R^1$ derives from an oil of animal or plant origin, or from products resulting from alcoholysis of the oils cited above.

6. Polyalkoxylated superamides according claim 1, wherein radicals $R^2$ and $R^3$, which may or may not be identical, represent a hydrogen atom or a saturated $C_1$–$C_4$ hydrocarbon radical, a propyl radical or its isomers, or a butyl radical or its isomers.

7. Polyalkoxylated superamides according to claim 1, wherein radicals $R^4$ and $R^5$ are selected from hydrogen or the methyl radical.

8. A process for preparing polyalkoxylated superamides according to claim 1, wherein the following steps are carried out:
   a) firstly, reacting a fatty acid ester the acid-derived portion of which is a linear, branched or cyclic, saturated or unsaturated $C_7$–$C_{22}$ hydrocarbon radical that may carry at least one hydroxyl group; and in which the alcohol-derived portion is a $C_1$–$C_4$ hydrocarbon radical, with an alkanolamine with formula $NH_1R^2$—$CH_2$—$CHR^3$—$OH$ or $NH$—$(CH_2$—$CHR^3$—$OH)_2$, optionally in the presence of a basic compound;
   b) reacting the product obtained at the end of step a) with a compound with formula:

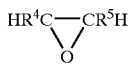

where $R^4$ and $R^5$ are as defined above;
   c) reacting the product obtained at the end of step b) with ethylene oxide;
   d) optionally, carrying out a step for functionalising the product obtained during step c) with the aim of replacing the terminal hydrogen atom with a hydrocarbon radical, a phosphate function, a carboxylate function, a sulphate function or a sulphonate function;

the proportions of the various reactants employed being such that formulae (I) or (II) are satisfied.

9. An emulsifying agent comprising the polyalkoxylated superamides according to claim 1.

10. An emulsifying agent for oil, an oil derivative or for a fatty acid ester, comprising the polyalkoxylated superamides according to claim 1, these compounds being present alone or as a mixture.

11. An additive in fluids used in treating or forming metals comprising the polyalkoxylated superamides according to claim 1.

12. The additive according to claim 11, wherein the amount of polyalkoxylated superamides in the fluid is in the range 0 (excluded) to 40% by weight of said fluid.

13. The additive according to claim 10, wherein the amount of oil in the fluid represents up to 80% by weight of said fluid.

14. The additive according to claim 13, wherein the water content is in the range 0 (excluded) to 50% by weight of the fluid.

15. The additive according to claim 13, wherein the fluid comprises other emulsifying agents, in an amount in the range 0 to 30% by weight of fluid.

16. The additive according to claim 13, wherein the fluid comprises at least lubricating additives; or at least extreme pressure additives, or at least anti-corrosion agents, biocides, bactericides, anti-foaming agents, in an amount in the range 0 to 20% by weight.

17. An anticorrosion agent comprising the polyalkoxylated superamides according to claim 1.

18. A lubricating agent comprising the polyalkoxylated superamides according to claim 1.

19. An anti-wear agent comprising the polyalkoxylated superamides according to claim 1 and wherein X is a phosphate radical.

20. A dispersing agent comprising the polyalkoxylated superamides according to claim 1 and wherein X is a carboxylate radical.

* * * * *